(12) United States Patent  
Sitaram et al.

(10) Patent No.: US 9,386,497 B1  
(45) Date of Patent: Jul. 5, 2016

(54) MANAGING A WIRELESS DATA COMMUNICATION SESSION

(71) Applicant: Sprint Spectrum LP, Overland Park, KS (US)

(72) Inventors: Krishna Sitaram, Chantilly, VA (US); Daniel Vivanco, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 230 days.

(21) Appl. No.: 14/020,596

(22) Filed: Sep. 6, 2013

(51) Int. Cl.
  *H04W 36/30* (2009.01)
  *H04W 36/16* (2009.01)
  *H04W 48/18* (2009.01)

(52) U.S. Cl.
  CPC .............. *H04W 36/30* (2013.01); *H04W 36/16* (2013.01); *H04W 48/18* (2013.01)

(58) Field of Classification Search
  None
  See application file for complete search history.

(56) References Cited

U.S. PATENT DOCUMENTS

| | | |
|---|---|---|
| 7,403,778 B2 | 7/2008 | Reynolds |
| 7,643,830 B2 | 1/2010 | Catovic et al. |
| 8,380,200 B1 | 2/2013 | Spitzer et al. |
| 2003/0050063 A1* | 3/2003 | Faerber ................. H04W 36/30 455/437 |
| 2004/0072581 A1* | 4/2004 | Tajima .................. H04W 36/32 455/456.1 |
| 2005/0075074 A1* | 4/2005 | Benson et al. ............. 455/67.11 |
| 2010/0056129 A1* | 3/2010 | Kono ............................ 455/419 |
| 2010/0074220 A1* | 3/2010 | Jung et al. ..................... 370/331 |
| 2011/0002305 A1* | 1/2011 | Park et al. ..................... 370/331 |
| 2011/0053596 A1* | 3/2011 | Wohlert et al. ............... 455/436 |
| 2011/0164589 A1* | 7/2011 | Lee et al. ...................... 370/331 |
| 2011/0176430 A1* | 7/2011 | Zetterberg et al. ............ 370/242 |
| 2011/0182272 A1* | 7/2011 | Santhanam ........... H04W 36/14 370/332 |
| 2012/0040662 A1* | 2/2012 | Rahman et al. ............... 455/423 |
| 2013/0065632 A1* | 3/2013 | Macias et al. ................. 455/525 |
| 2013/0072189 A1* | 3/2013 | Cheng et al. .................. 455/436 |
| 2013/0109393 A1* | 5/2013 | Shi et al. ....................... 455/437 |
| 2013/0235849 A1* | 9/2013 | Ekici ................. H04W 36/0088 370/336 |
| 2014/0254399 A1* | 9/2014 | Yang et al. .................... 370/252 |

* cited by examiner

*Primary Examiner* — Daniel Lai

(57) ABSTRACT

An application requirement is identified of a wireless device in communication with an access node using a first radio access technology, and a probability is determined that a communication session of the wireless device using the first radio access technology will be dropped based on a wireless device mobility and characteristics of a plurality of neighbor access nodes of the access node. A handover threshold is calculated based on the application requirement and the determined probability, and when a signal level of the first radio access technology received at the wireless device meets the handover threshold, the wireless device is instructed to change from communicating with the access node using the first radio access technology to communicating with the access node using the second radio access technology.

20 Claims, 7 Drawing Sheets

US 9,386,497 B1

MANAGING A WIRELESS DATA COMMUNICATION SESSION

TECHNICAL BACKGROUND

In a wireless communication network which supports multiple radio access technologies, a wireless device communicating with the network can transition among radio access technologies. The transition may be due to various reasons, including the wireless device moving beyond the effective range of a signal using a particular radio access technology, the unavailability of a certain radio access technology at a particular access node, a drop-off in a signal using a particular radio access technology below a certain threshold level, a decline in a throughput of a particular radio access technology below a threshold, and the like. Where different radio access technologies have different data rates, throughputs, carrying capacities, and so forth, determining when to transition a wireless device from one radio access technology to another radio access technology can affect the delivery of information and services to the wireless device, which can affect an overall user experience.

OVERVIEW

In operation, an application requirement is identified of a wireless device in communication with an access node using a first radio access technology. A probability is determined that the communication with the access node using the first radio access technology will be dropped based on a wireless device mobility and characteristics of a plurality of neighbor access nodes of the access node. Based on the application requirement and the determined probability, a handover threshold is calculated. The wireless device is instructed to change from communicating with the access node using the first radio access technology to communicating with the access node using the second radio access technology when a signal level of the first radio access technology received at the wireless device meets the handover threshold.

DETAILED DESCRIPTION

Figure 1:
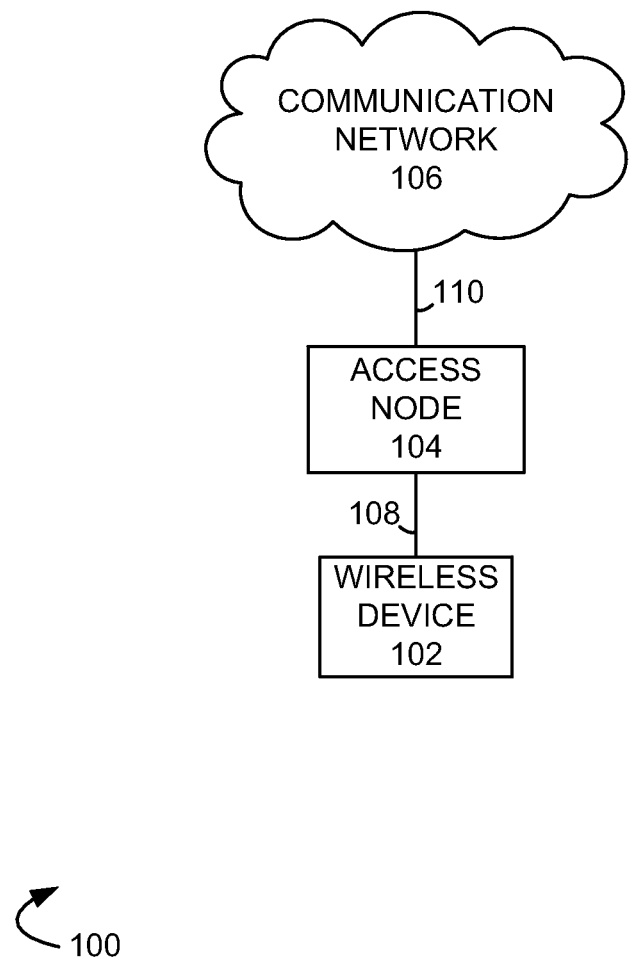
FIG. 1 illustrates an exemplary communication system to manage a wireless data communication session.

FIG. 1 illustrates an exemplary communication system 100 to manage a wireless data communication session comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Communication system 100 can support multiple radio access technologies. When wireless device 102 is in communication with access node 104, communication system 100 can transition wireless device 102 among the supported radio access technologies. The transition may be due to various reasons, including wireless device 102 moving beyond the effective range of a signal using a particular radio access technology, the unavailability of a certain radio access technology at access node 104 (or, for example, at a neighbor access node of access node 104, were wireless device 102 to be handed over to the neighbor access node), a drop-off in a signal using a particular radio access technology below a certain threshold level, a decline in a throughput of a particular radio access technology below a threshold, and the like. Where different radio access technologies have different data rates, throughputs, carrying capacities, and so forth, determining when to transition wireless device 102 from one radio access technology to another radio access technology can affect the delivery of information and services to the wireless device.

In operation, an application requirement of wireless device 102 is identified, where wireless device 102 is in communication with access node 104 using a first radio access technology. A probability that the communication with access node 104 using the first radio access technology will be dropped is determined based on a mobility of wireless device 102 and characteristics of a plurality of neighbor access nodes of access node 104. A handover threshold is calculated based on the application requirement and the determined probability to determine a threshold at which wireless device 102 can be instructed to change from the first radio access technology to a second radio access technology. When a signal level of the first radio access technology received at the wireless device meets the handover threshold, wireless device 102 is instructed to change from communicating with the access node using the first radio access technology to communicating with the access node using the second radio access technology.

Figure 2:
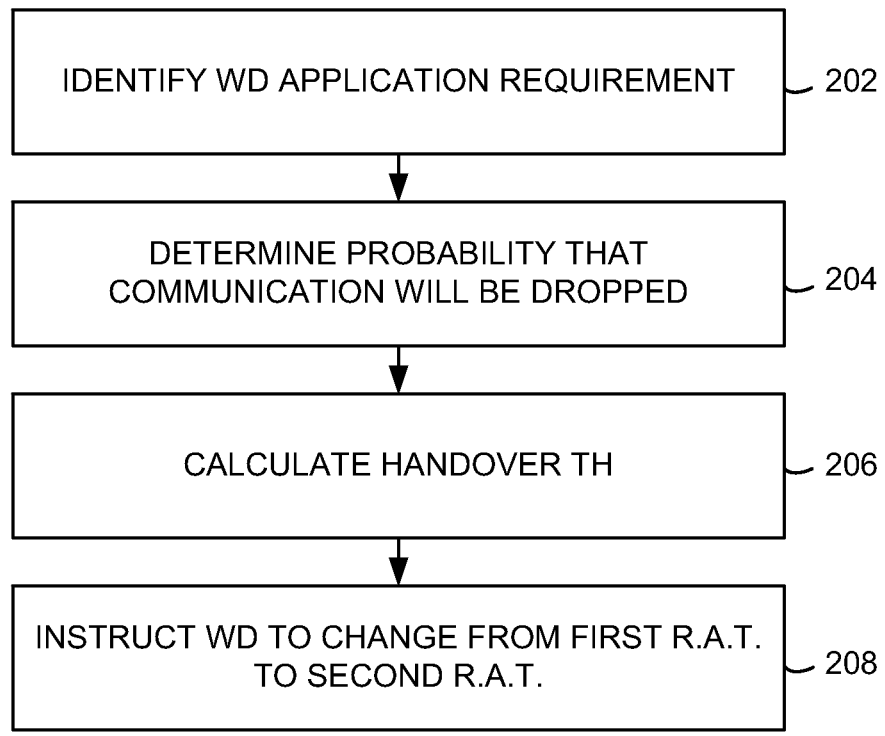
FIG. 2 illustrates an exemplary method of managing a wireless data communication session.

FIG. 2 illustrates an exemplary method of managing a wireless data communication session. An application requirement is identified of a wireless device in communication with an access node using a first radio access technology (operation 202). For example, an application requirement of wireless device 102 is identified, where wireless device is in communication with access node 104 using a first radio access technology. The application requirement can comprise, for example, a minimum data rate, a minimum data throughput, a maximum permitted data delay, a maximum permitted error rate, a maximum permitted packet loss rate, and the like. The application requirement can be determined based on a type of application running on wireless device 102. For example, a delay sensitive application can require a relatively high minimum data rate, a relatively high minimum data throughput, a relatively low maximum permitted data delay, a relatively low maximum permitted error rate, a relatively low maximum permitted packet loss rate, a relatively low data retransmission rate, and the like. Examples of a delay sensitive application can comprise a voice application (e.g., a voice over internet protocol (VoIP) application), a streaming media application (involving, e.g., a relatively steady transmission of audio, video, and/or multimedia data to the wireless device), an application downloading a file, and similar applications. A delay insensitive application can comprise a relatively low minimum data rate requirement, a relatively low minimum data throughput requirement, a relatively high maximum permitted data delay requirement, a relatively high maximum permitted error rate requirement, a relatively high maximum permitted packet loss rate requirement, a relatively high data retransmission rate requirement, and the like. Examples of a delay insensitive application can comprise a web browser, an email application, a text messaging application, and the like.

Next, a probability is determined that a communication session of the wireless device using the first radio access technology will be dropped based on a wireless device mobility and characteristics of a plurality of neighbor access nodes of the access node (operation 204). The wireless device mobility can comprise, for example, a direction and/or speed of motion of wireless device 102 relative to access node 104.

Figure 3:
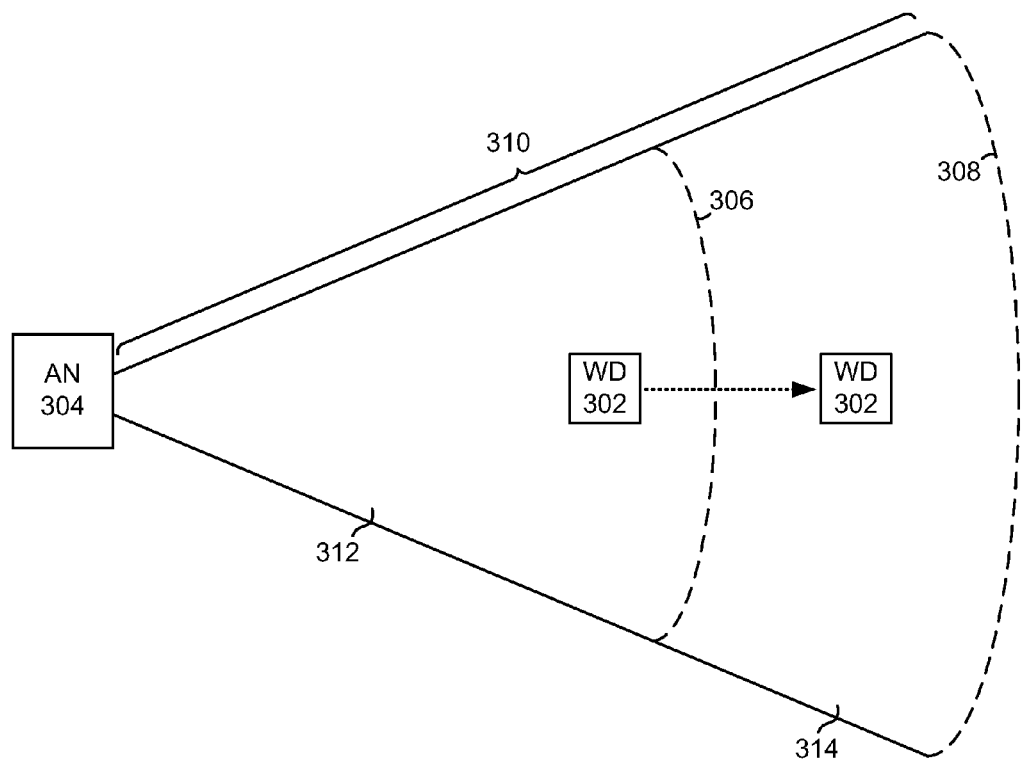
FIG. 3 illustrates exemplary coverage radii of radio access technologies.

As one example, as illustrated in FIG. 3, a wireless device (302) can move away from an access node (304) with which it is in communication.

Figure 4:
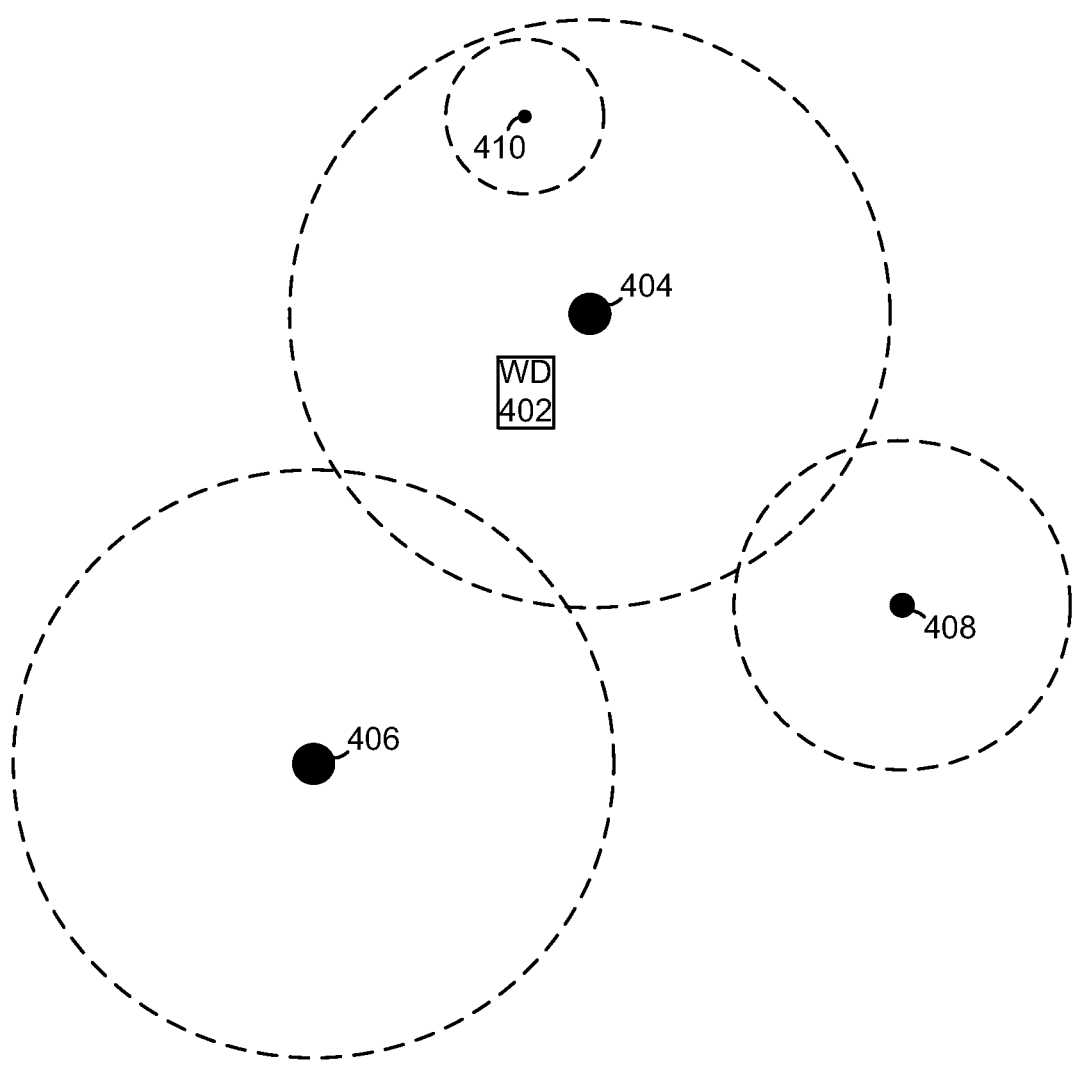
FIG. 4 illustrates exemplary coverage radii of access nodes.

Neighbor access nodes to access node 104 can comprise a variety of access node types in a variety of locations. For example, FIG. 4 illustrates wireless device 402 served by access node 404. Neighbor access nodes 406, 408 and 410 each comprises a coverage area of varying size (illustrated with dashed line circles). For example, access node 406 can comprise a cell tower, such as an eNodeB or a base station subsystem, further comprising a coverage area of roughly the same area as that of access node 404. Access node 408 can comprise a smaller coverage area, due to a lower broadcast power, or to radio frequency interference limiting its transmission range, or to some other factor decreasing its coverage area. Access node 410 can comprise a small transceiver, such as a picocell or femtocell, and which can further comprise a coverage area within the coverage area of access node 404. A picocell or femtocell can also be located within a coverage gap or coverage hole of access node 404, to supplement network coverage in such area. Each neighbor access node can comprise access node characteristics which can be used to determine a probability that the communication session of the wireless device using the first radio access technology will be dropped.

A characteristic of neighbor access nodes can comprise an indication that a neighbor access node is configured to use the first radio access technology. The greater the number of neighbor access nodes which are configured to use the first radio access technology, the lower the probability that the communication session of the wireless device using the first radio access technology will be dropped. A characteristic of neighbor access nodes can also comprise a signal level of a signal using the first radio access technology of each of the plurality of neighbor access nodes. The greater the first radio access technology signal level of the neighbor access nodes, the lower the probability that the communication session of the wireless device using the first radio access technology will be dropped.

A characteristic of neighbor access nodes can also comprise a coverage radius of a signal level of a signal using the first radio access technology of each of the plurality of neighbor access nodes. The greater the first radio access technology signal radius of the neighbor access nodes, the lower the probability that the communication session of the wireless device using the first radio access technology will be dropped. Further, a characteristic of neighbor access nodes can also comprise a carrying capacity of a carrier using the first radio access technology of each of the plurality of neighbor access nodes. Carrying capacity can be based on air interface congestion, backhaul congestion, resource utilization (such as utilization level of physical resources such as physical resource blocks and the like), demand for air interface or backhaul resources (such as from a buffer status report or other similar request from a wireless device for the assignment of resources), and so forth. Other examples of neighbor access node characteristics are also possible, including combinations of the foregoing.

Returning to FIG. 2, a handover threshold is calculated based on the application requirement and the determined probability (operation 206), and when a signal level of the first radio access technology received at the wireless device meets the handover threshold the wireless device is instructed to change from communicating with the access node using the first radio access technology to communicating with the access node using the second radio access technology (operation 208). For example, where the application requirement is relatively high, and/or where the probability of dropping the communication session of the wireless device using the first radio access technology is relatively high (e.g., meets or exceeds a probability threshold), then the calculated handover threshold will be relatively low. Conversely, where the application requirement is relatively low, and/or where the probability of dropping the communication session of the wireless device using the first radio access technology is relatively low (e.g., is below a probability threshold), then the calculated handover threshold will be relatively high.

FIG. 3 illustrates an exemplary handover threshold 306. When wireless device 302 moves away from access node 304 such that a signal level of the first radio access technology received at wireless device 302 meets handover threshold 306, wireless device 302 can be instructed to change from communicating with access node 304 using the first radio access technology to communicating with the access node using the second radio access technology. Radius 310 illustrates a transmission radius of signals from access node 304, which can include both the first radio access technology and the second radio access technology. When wireless device 302 is within area 312, wireless device 302 is typically instructed to use the first radio access technology to communicate with access node 304. Area 314 comprises a coverage area of access node 304 in which wireless device 302 is typically instructed to use the second radio access technology to communicate with access node 304 when wireless device 302 moves away from access node 304. A communication session of wireless device 302 can be a data communication session, or it can be a voice communication session. The voice communication can use a data communication session (e.g., voice over internet protocol (VoIP), voice over LTE (VoLTE), and the like). The second radio access technology can comprise a lower speed radio access technology, or a higher latency radio access technology, than the first radio access technology. Examples of higher speed (or lower latency) radio access technologies includes WiMAX, LTE, LTE Advanced, and other so-called 4G technologies. Examples of lower speed (or higher latency) radio access technologies include EV-DO, CDMA, GSM, and other so-called 3G technologies. Threshold 308 comprises an entrance threshold, where a wireless device which is moving toward access node 304 can be instructed to communicate with access node 304 using the first radio access technology. In an embodiment, handover thresholds 306 and 308 can comprise a signal level of the first radio access technology from access node 304.

Handover threshold 306 can be calculated based on an application requirement of wireless device 302, and the determined probability that a communication session of wireless device 302 using the first radio access technology will be dropped. A different handover threshold 306 can be calculated for each wireless device in a coverage area of access node 304. That is, a different handover threshold can be calculated for each of a plurality of wireless devices of access node 304, and a communication session of each of the plurality of wireless devices in communication with access node 304 can be instructed to use one of the first radio access technology and the second radio access technology according to the handover threshold of each of the wireless devices. Calculating handover threshold 306 involves a balance of performance requirements of wireless device 302 and efficient use of available first radio access technology coverage and resources. Decreasing handover threshold 306, to move handover threshold 306 closer to access node 304 and decrease area 312, can cause wireless device 302 to be instructed to use the second radio access technology when wireless device is closer to access node 304, which may use available first radio access technology coverage and resources poorly (or less efficiently). Increasing handover threshold 306, to move handover threshold 306 away from access node 304 and increase area 312 (which will also decrease area 314 as long as threshold 308 remains unchanged), can allow wireless device 302 to remain on the first radio access technology longer, but may also increase the probability that a communication session of wireless device 302 using the first radio access technology will be dropped.

Figure 5:
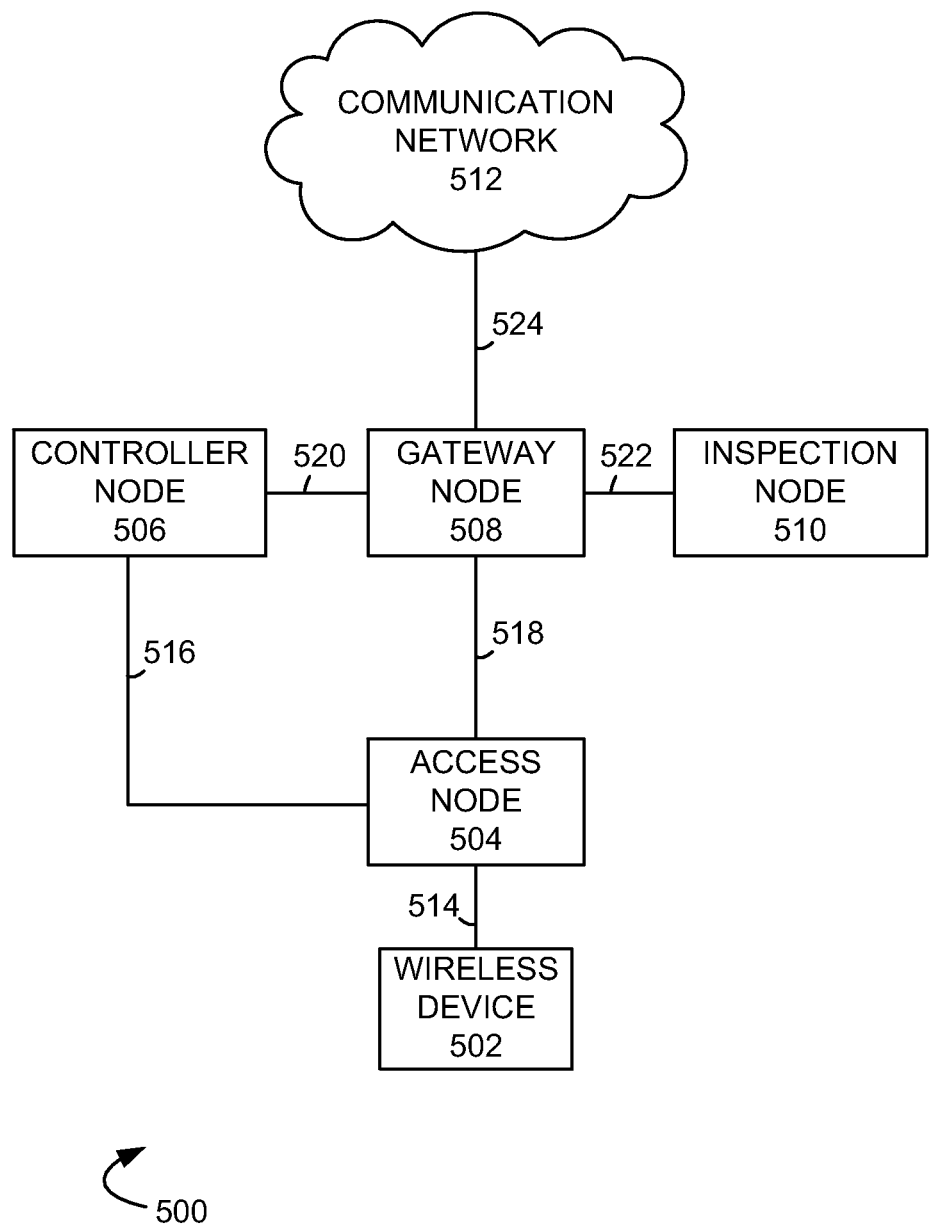
FIG. 5 illustrates another exemplary communication system to manage a wireless data communication session.

FIG. 5 illustrates another exemplary communication system 500 to manage a wireless data communication session comprising wireless device 502, access node 504, controller node 506, gateway node 508, inspection node 510, and communication network 512. Examples of wireless device 502 can comprise a cell phone, a smart phone, a computing platform such as a laptop, palmtop, or tablet, a personal digital assistant, or an internet access device, including combinations thereof. Wireless device 502 is in communication with access node 504 over communication link 514.

Access node 504 is a network node capable of providing wireless communications to wireless device 502, and can be, for example, a base transceiver station, a radio base station, an eNodeB device, or an enhanced eNodeB device. Access node 504 is in communication with controller node 506 over communication link 516, and with gateway node 508 over communication link 518.

Controller node 506 can comprise can comprise a processor and associated circuitry to execute or direct the execution of computer-readable instructions, and can be configured to manage a wireless data communication session associated with wireless device 502. Controller node 506 can control the setup and maintenance of a communication session over communication network 512 by wireless device 502. Controller node 506 can comprise a mobile switching center (MSC), a dispatch call controller (DCC), a mobility management entity (MME), or other similar network node. Controller node 506 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 506 can receive instructions and other input at a user interface. Controller node 506 is in communication with gateway node 508 over communication link 520.

Gateway node 508 can comprise a processor and associated circuitry to execute or direct the execution of computer-readable instructions, and can be configured to manage a wireless data communication session associated with wireless device 502. Gateway node 508 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 508 can receive instructions and other input at a user interface. Examples of gateway node 508 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 508 is in communication with communication network 512 over communication link 524, and with inspection node 510 over communication link 522.

Inspection node 510 is a network element which can comprise a processor and associated circuitry to execute or direct the execution of computer-readable instructions. Inspection node 510 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 510 can, among other things, perform deep packet inspection of packets sent from and/or to wireless device 502. Deep packet inspection generally involves an inspection of packets beyond Open Systems Interconnection (OSI) layer 2 including an inspection of the data portion (also referred to as the payload portion) of a packet (and possibly also the header of a packet). That is, deep packet inspection can involve an examination of any of layers 2 through 7 of the OSI model. The data portion of a packet remains distinct from a header portion, even where the packet receives additional header information (such as by packet encapsulation or a similar process). In other words, when a packet is encapsulated, any additional header information does not combine information from the data portion with any header portion. Inspection node 510 can be for example, a standalone computing device or network element, or the functionality of mode inspection node 510 can be included in another network element, such as a mobility management entity (MME), a gateway, a proxy node, or another network element. Among other things, inspection node 510 can determine application requirements of an application running on wireless device 502 by performing deep packet inspection on data packets sent from wireless device 502.

Communication network 512 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 512 can be capable of carrying voice information and other data, for example, to support communications by a wireless device such as wireless device 502. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 512 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 512 may also comprise a wireless network, including base stations, wireless communication nodes, telephony switches, internet routers, network gateways, computer systems, communication links, or some other type of communication equipment, and combinations thereof.

Communication links 514, 516, 518, 520, 522 and 524 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 504, controller node 506, gateway node 508, inspection node 510, and communication network 512 which are omitted for clarity, including additional processing nodes, routers, gateways, and physical and/or wireless data links for carrying data among the various network elements.

Figure 6:
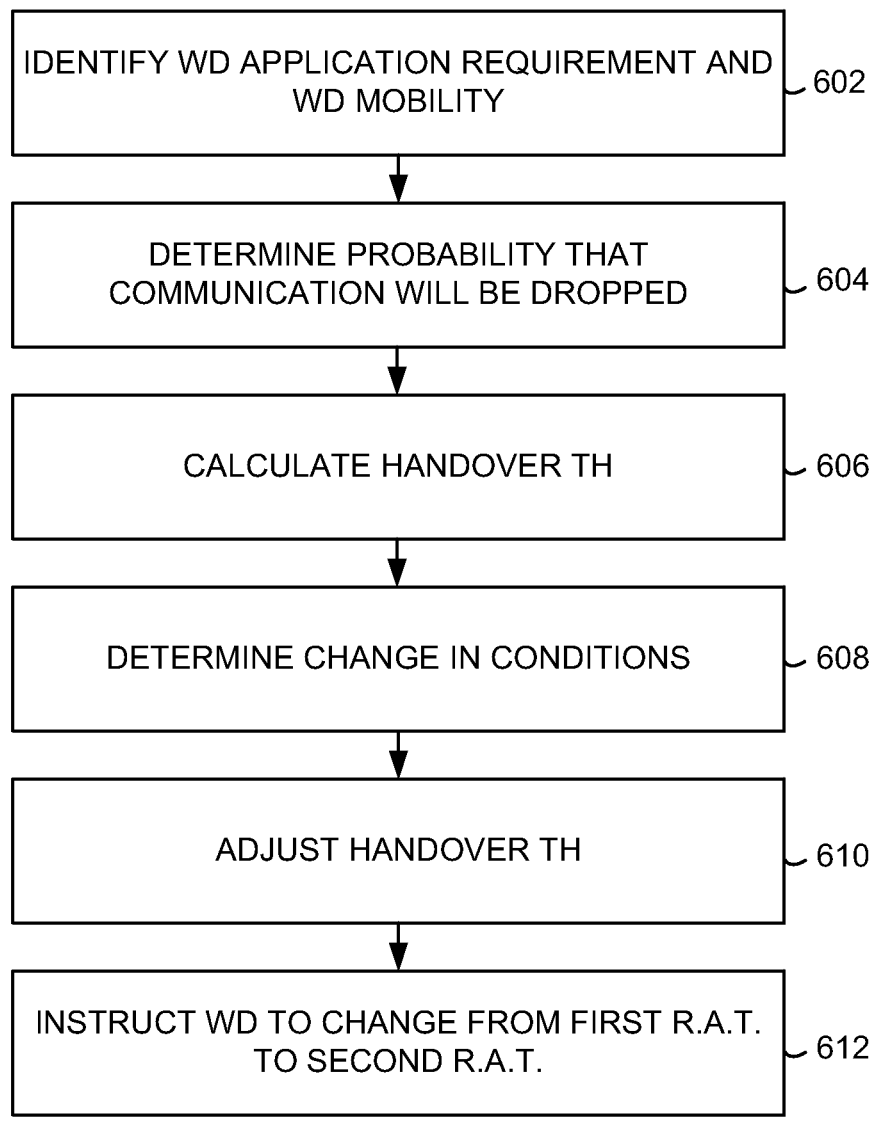
FIG. 6 illustrates another exemplary method of managing a wireless data communication session.

FIG. 6 illustrates another exemplary method of managing a wireless data communication session. In operation 602, a wireless device mobility and an application requirement of an application running on a wireless device are determined. The wireless device mobility can comprise, for example, a direction and/or speed of motion of wireless device 502 relative to access node 504. The application requirement can be determined based on information provided by wireless device 502 about the application. The application requirement can also be determined by inspection node 510. The application requirement can comprise, for example, a minimum data rate, a minimum data throughput, a maximum permitted data delay, a maximum permitted error rate, a maximum permitted packet loss rate, and the like. For example, a delay sensitive application can require a relatively high minimum data rate, a relatively high minimum data throughput, a relatively low maximum permitted data delay, a relatively low maximum permitted error rate, a relatively low maximum permitted packet loss rate, a relatively low data retransmission rate, and the like. Examples of a delay sensitive application can comprise a voice application (e.g., a voice over internet protocol (VoIP) application), a streaming media application (involving, e.g., a relatively steady transmission of audio, video, and/or multimedia data to the wireless device), an application downloading a file, and similar applications. A delay insensitive application can comprise a relatively low minimum data rate requirement, a relatively low minimum data throughput requirement, a relatively high maximum permitted data delay requirement, a relatively high maximum permitted error rate requirement, a relatively high maximum permitted packet loss rate requirement, a relatively high data retransmission rate requirement, and the like. Examples of a delay insensitive application can comprise a web browser, an email application, a text messaging application, and the like.

Next, a probability is determined that a communication session of the wireless device using the first radio access technology will be dropped based on the wireless device mobility and characteristics of a plurality of neighbor access nodes of the access node (operation 604). A characteristic of neighbor access nodes can comprise an indication that a neighbor access node is configured to use the first radio access technology; a signal level of a signal using the first radio access technology of each of the plurality of neighbor access nodes; a coverage radius of a signal level of a signal using the first radio access technology of each of the plurality of neighbor access nodes; and a carrying capacity of a carrier using the first radio access technology of each of the plurality of neighbor access nodes. Other examples of neighbor access node characteristics are also possible, including combinations of the foregoing.

A handover threshold is calculated based on the application requirement and the determined probability (operation 606). Where the application requirement is relatively high, and/or where the probability of dropping the communication session of the wireless device using the first radio access technology is relatively high (e.g., meets or exceeds a probability threshold), then the calculated handover threshold will be relatively low. Conversely, where the application requirement is relatively low, and/or where the probability of dropping the communication session of the wireless device using the first radio access technology is relatively low (e.g., is below a probability threshold), then the calculated handover threshold will be relatively high.

It can be determined that conditions have changed (operation 608), and based on the changes conditions the handover threshold can be adjusted (operation 610), so that the handover threshold can be adjusted dynamically. For example, the wireless device mobility can change so that the wireless device is moving less quickly, or changes direction to move toward the serving access node, or so that its distance from the serving access node remains substantially the same, and so forth. As another example, the wireless device may move to an area where the characteristics of the neighbor access have changed. Referring to FIG. 4, for example, wireless device 402 may move from a location closer to access nodes 406 and 408 to a location closer to access node 410, which is relatively farther from access nodes 406 and 408. Further, because access node 410 comprises a femtocell or picocell, the determined characteristics of neighbor access nodes 406, 408 and 410 will change for wireless device 402. When the characteristics of the neighbor access nodes meets a first criteria, the handover threshold can be increased. For example, the handover threshold can be increased (i.e., moved away from the serving access node) when fewer neighbor access nodes are configured to use the first radio access technology, or when a signal level decreases of a signal using the first radio access technology of each of the plurality of neighbor access nodes, or when a coverage radius decreases of a signal level of a signal using the first radio access technology of each of the plurality of neighbor access nodes, or when a carrying capacity decreases of a carrier using the first radio access technology of each of the plurality of neighbor access nodes. As another example, the handover threshold can be decreased (i.e., moved closer to the serving access node) when more neighbor access nodes are configured to use the first radio access technology, or when a signal level increases of a signal using the first radio access technology of each of the plurality of neighbor access nodes, or when a coverage radius increases of a signal level of a signal using the first radio access technology of each of the plurality of neighbor access nodes, or when a carrying capacity increases of a carrier using the first radio access technology of each of the plurality of neighbor access nodes. Other characteristics causing the handover threshold to be increased or decreased are also possible, including combinations thereof.

In addition, application requirements of wireless device 502 can also change. For example, wireless device may change from using an application with higher requirements (e.g., a VoIP application) to an application with lower requirements (e.g., a web browser), or vice versa. When it is determined that the application requirement of the wireless device decreases, the handover threshold can be increased based on the decreased application requirement. When it is determined that the application requirement of the wireless device increases, the handover threshold can be decreased based on the increased application requirement.

When a signal level of the first radio access technology received at the wireless device meets the handover threshold the wireless device is instructed to change from communicating with the access node using the first radio access technology to communicating with the access node using the second radio access technology (operation 612).

Figure 7:
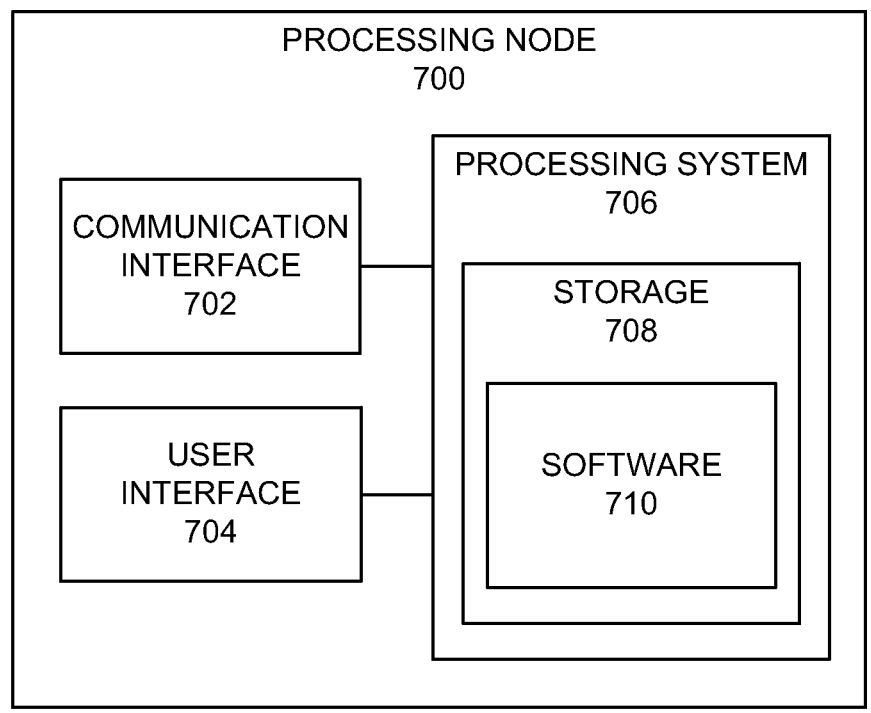
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to manage a wireless data communication session. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access node 104, access node 504, controller node 506, gateway node 508, and inspection node 510. Processing node 700 can also be an adjunct or component of a network element, such as an element of access node 104, access node 504, controller node 506, gateway node 508, and inspection node 510. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing a wireless data communication session, comprising:
    identifying an application requirement of a wireless device in communication with an access node using a first radio access technology, wherein the application requirement is identified using a deep packet inspection of one or more data packets transmitted between the wireless device and the access node;
    determining a probability that a communication session of the wireless device using the first radio access technology will be dropped based on a wireless device mobility and characteristics of a plurality of neighbor access nodes of the access node;
    calculating a handover threshold based on the application requirement and the determined probability; and
    instructing the wireless device to change from communicating with the access node using the first radio access technology to communicating with a second access node using a second radio access technology when a signal level of the first radio access technology received at the wireless device meets the handover threshold.

2. The method of claim 1, wherein the characteristics of the plurality of neighbor access nodes further comprise an indication that each neighbor access node is configured to use the first radio access technology.

3. The method of claim 1, wherein the characteristics of the plurality of neighbor access nodes further comprise a signal level of a signal using the first radio access technology of each of the plurality of neighbor access nodes.

4. The method of claim 1, wherein the characteristics of the plurality of neighbor access nodes further comprise a coverage radius of a signal level of a signal using the first radio access technology of each of the plurality of neighbor access nodes.

5. The method of claim 1, wherein the characteristics of the plurality of neighbor access nodes further comprise a carrying capacity of a carrier using the first radio access technology of each of the plurality of neighbor access nodes.

6. The method of claim 1, further comprising determining the probability that the communication session of the wireless device using the first radio access technology will be dropped based on the wireless device mobility, the characteristics of the plurality of neighbor access nodes, and a coverage radius of the first radio access technology.

7. The method of claim 1, comprising:
    determining that the application requirement of the wireless device decreases; and
    increasing the handover threshold based on the decreased application requirement.

8. The method of claim 1, further comprising:
    determining that the application requirement of the wireless device increases; and
    decreasing the handover threshold based on the increased application requirement.

9. The method of claim 1, further comprising:
    determining that the characteristics of plurality of neighbor access nodes of the access node meets a first criteria; and
    increasing the handover threshold.

10. The method of claim 1, further comprising:
    determining that the characteristics of plurality of neighbor access nodes of the access node meets a second criteria; and
    decreasing the handover threshold.

11. The method of claim 1, wherein the application requirement comprises at least one of a minimum data rate, a minimum data throughput, a maximum permitted data delay, a maximum permitted error rate, a maximum permitted packet loss rate, and a maximum data retransmission rate.

12. A system of managing a wireless data communication session, comprising:
    a processing node, configured to
        identify an application requirement of a wireless device in communication with an access node using a first radio access technology, wherein the application requirement is identified using a deep packet inspection of one or more data packets transmitted between the wireless device and the access node;
        determine a probability that a communication session of the wireless device using the first radio access technology will be dropped based on a wireless device mobility and characteristics of a plurality of neighbor access nodes of the access node;
        calculate a handover threshold based on the application requirement and the determined probability; and
        instruct the wireless device to change from communicating with the access node using the first radio access technology to communicating with a second access node using a second radio access technology when a signal level of the first radio access technology received at the wireless device meets the handover threshold.

13. The system of claim 12, wherein the characteristics of the plurality of neighbor access nodes further comprise an indication that each neighbor access node is configured to use the first radio access technology.

14. The system of claim 12, wherein the characteristics of the plurality of neighbor access nodes further comprise a signal level of a signal using the first radio access technology of each of the plurality of neighbor access nodes.

15. The system of claim 12, wherein the characteristics of the plurality of neighbor access nodes further comprise a coverage radius of a signal level of a signal using the first radio access technology of each of the plurality of neighbor access nodes.

16. The system of claim 12, wherein the characteristics of the plurality of neighbor access nodes further comprise a carrying capacity of a carrier using the first radio access technology of each of the plurality of neighbor access nodes.

17. The system of claim 12, wherein the processing node is further configured to:
    determine the probability that the communication session of the wireless device using the first radio access technology will be dropped based on the wireless device mobility, the characteristics of the plurality of neighbor access nodes, and a coverage radius of the first radio access technology.

18. The system of claim 12, wherein the processing node is further configured to:
- determine that the application requirement of the wireless device decreases; and
- increase the handover threshold based on the decreased application requirement.

19. The system of claim 12, wherein the processing node is further configured to:
- determine that the application requirement of the wireless device increases; and
- decrease the handover threshold based on the increased application requirement.

20. The system of claim 12, wherein the processing node is further configured to:
- increase the handover threshold when it is determining that the characteristics of plurality of neighbor access nodes of the access node meets a first criteria; and
- decrease the handover threshold when it is determined that the characteristics of plurality of neighbor access nodes of the access node meets a second criteria.

* * * * *